United States Patent [19]
Abrahamian et al.

[11] Patent Number: 5,762,665
[45] Date of Patent: Jun. 9, 1998

[54] VEHICULAR AIR PURIFICATION SYSTEM

[76] Inventors: Nichan A. Abrahamian; Kathleen Abrahamian, both of 867 Kirts Blvd., Troy, Mich. 48084

[21] Appl. No.: 825,752

[22] Filed: Apr. 3, 1997

[51] Int. Cl.$^6$ ....................................................... B03C 3/00
[52] U.S. Cl. .......................... 55/385.3; 55/385.1; 55/473; 55/481
[58] Field of Search ..................... 55/385.1, 385.3, 55/124, 138, 139, 140, 316, 473, 481; 362/226; 350/276; 353/13; 128/419 P

[56] References Cited

U.S. PATENT DOCUMENTS

| | | | |
|---|---|---|---|
| 4,247,850 | 1/1981 | Marcus | 350/276 |
| 4,442,840 | 4/1984 | Wojciechowicz, Jr. | 128/419 P |
| 4,556,046 | 12/1985 | Riffel et al. | 55/385.3 |
| 4,816,973 | 3/1989 | Atalla et al. | 362/226 |
| 4,919,693 | 4/1990 | Olney | 55/124 |
| 5,223,868 | 6/1993 | Coiner, II | 353/13 |
| 5,350,444 | 9/1994 | Gould et al. | 55/385.3 |
| 5,433,772 | 7/1995 | Sikora | 55/385.3 |
| 5,494,497 | 2/1996 | Lee | 55/385.3 |

*Primary Examiner*—Jay H. Woo
*Assistant Examiner*—Minh-Chau T. Pham

[57] ABSTRACT

A vehicular air purification system for use with a vehicle having a ventilation system with a plurality of output vents each including a plurality of horizontally positioned directing vanes. Included is an active filter unit housing with a rectilinear configuration having a closed top face, a closed bottom face, a front face, a rear face, and a pair of closed side faces defining an interior space. The rear face and the front face both have a plurality of horizontal ventilation slots. One of the faces of the active filter unit housing has a clip adapted to allow the active filter unit housing to be removably attached within the vehicle. A motor support situated within the active filter unit housing is included for bracing a motor situated therein. The motor has a stator fixedly coupled to the motor support with an axis defined by the motor positioned perpendicularly with respect to the front face and the rear face of the active filter unit housing. The motor further has a rotor coaxially coupled within the stator with a fan coupled thereto for rotating upon the receipt of power by the motor. Further included is a vehicle cigarette lighter power adapter and a connection wire coupled between contacts of the power adapter and the motor. A first filter is coupled to the active filter unit housing for filtering air passing between the front and rear faces thereof. Working in conjunction with the active filter unit is at least one passive filter unit housing.

1 Claim, 4 Drawing Sheets

VEHICULAR AIR PURIFICATION SYSTEM

BACKGROUND OF THE INVENTION

1. Field of the Invention

The present invention relates to a vehicular air purification system and more particularly pertains to purifying air within a vehicle.

2. Description of the Prior Art

The use of air purifiers is known in the prior art. More specifically, air purifiers heretofore devised and utilized for the purpose of scenting air within a vehicle are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,368,620 to Chiba et al.; U.S. Pat. No. 4,919,693 to Olney; U.S. Pat. Des. 354,796 to Smith, Sr.; U.S. Pat. No. 5,437,701 to Townsley; U.S. Pat. No. 5,302,123 to Bechard; and U.S. Pat. No. 5,342,238 to Segerpalm et al.

In this respect, the vehicular air purification system according to the present invention substantially departs from the conventional concepts and designs of the prior art, and in so doing provides an apparatus primarily developed for the purpose of purifying air within a vehicle.

Therefore, it can be appreciated that there exists a continuing need for a new and improved vehicular air purification system which can be used for purifying air within a vehicle. In this regard, the present invention substantially fulfills this need.

SUMMARY OF THE INVENTION

In view of the foregoing disadvantages inherent in the known types of air purifiers now present in the prior art, the present invention provides an improved vehicular air purification system. As such, the general purpose of the present invention, which will be described subsequently in greater detail, is to provide a new and improved vehicular air purification system which has all the advantages of the prior art and none of the disadvantages.

To attain this, the present invention essentially comprises a device for use with vehicle having a ventilation system with a plurality of output vents. As shown in FIG. 5, each of such output vents has a plurality of horizontally positioned directing vanes. Further, vehicle further includes a pair of sun visors and a vehicle cigarette lighter. The present invention includes an active filter unit housing with a rectilinear configuration having a closed top face, a closed bottom face, a front face, a rear face, and a pair of closed side faces defining an interior space. Note FIGS. 1 & 2. The rear face of the housing has a plurality of horizontal ventilation slots formed therein. The front face of the active filter unit housing also has a plurality of horizontal ventilation slots formed therein. A rear retention face is included having a size equal to that of the rear face. Such rear retention face is coupled to the rear face via a bottom strip and a pair of side strips defining a top rectangular slot. See FIG. 2. The top slot is adapted for allowing access to an intermediate space situated between the rear face and the rear retention face. It should be noted that the intermediate space defines less than 10% the volume defined by the interior space of the active filter unit housing. One of the side faces of the active filter unit housing includes an elongated resilient clip having a first end thereof integrally coupled thereto. As shown in FIG. 1, the length of the clip extends between the top face and the bottom face of the active filter unit housing. By this structure, the clip may be employed to removably attach the active filter unit housing to the visor of the vehicle. With reference now to FIG. 2, a motor support is included. Such support includes a rear brace having a pair of rods attached at first ends thereof to the top face and the bottom face of the active filter unit housing, respectively. The rods of the rear brace are coupled adjacent the rear face of the active filter unit housing and are angled inwardly toward a center of the interior space thereof. The rear brace further has an annular member coupled to second ends of the rods thereof. Associated with the rear braces is a front brace having a pair of rods attached at first ends thereof to the top face and the bottom face of the active filter unit housing, respectively, adjacent the front face thereof. Such rods are angled inwardly toward a center of the interior space of the housing. Similar to the rear brace, the front brace also has an annular member coupled to second ends of the rods thereof. Next provided is a motor having a stator fixedly coupled within the annular members of the motor support, as shown in FIG. 2. When fixed in place, an axis defined by the motor is positioned perpendicularly with respect to the front face and the rear face of the active filter unit housing. Another component of the motor is a rotor coaxially coupled within the stator with a four-vaned fan coupled thereto for rotating upon the receipt of power by the motor. As shown in FIG. 3, a vehicle cigarette lighter power adapter is included with a cylindrical configuration. The power adapter is included for inserting within the vehicle cigarette lighter and receiving power therefrom. The power adapter has a spring-biased contact situated on an end thereof for abutting a first terminal of the vehicle cigarette lighter. A pair of generally U-shaped resilient contacts are coupled to a periphery of the power adapter. Such contacts are adapted for abutting a second terminal of the vehicle cigarette lighter. For transferring power to the motor and fan, a connection wire is coupled between the contacts of the power adapter and the motor. The connection wire are situated through an aperture formed in the bottom face of the active filter unit housing with an associated elongated grommet encompassing a portion thereof. The connection wire further includes an alligator clip with a pair of opposing members pivotally coupled at central extents thereof. One of the opposing members is coupled to the connection wire at a central extent thereof. The alligator clip includes an unillustrated spring to afford a first biased open orientation and an unbiased closed orientation. It should be understood that the alligator clip is critical for clamping to a portion of an interior of the vehicle thereby maintaining the connection wire out of a view of the driver. Associated with the active filter unit housing is a first filter having a rectangular frame. A multiplicity of fibers are coupled within the frame. The fibers have fine carbon filaments attached thereto for preventing the passage of particles in air passing therethrough. In use, the first filter is removably situated in the top slot of the active filter unit housing for filtering air passing between the front and rear faces thereof. As an option, the first filter may be scented. Working conjunction with the active filter unit to purify air within a vehicle is a plurality of passive filter units each with an associated housings. Note FIG. 4. Each housing has a rectangular configuration with a front face, a rear face, a bottom face, and a pair of side faces defining an interior space with a top opening. The top face and the rear face both have a plurality of horizontal ventilation slots formed therein. As shown in FIG. 4, the rear face has a coupling means for connecting to the output vents of the vehicle.

Finally, a plurality of second filters are included each having a rectangular frame with a multiplicity of fibers having fine carbon filaments attached thereto. Similar to the filters of the active filter unit, the present filters are adapted for preventing the passage of particles in air passing therethrough. During use, the second filters each are removably situated in the interior space of an associated passive filter unit housing for filtering air passing between the front and rear faces thereof. In an alternate embodiment, the second filters are scented.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular air purification system which has all the advantages of the prior art air purifiers and none of the disadvantages.

It is another object of the present invention to provide a new and improved vehicular air purification system which may be easily and efficiently manufactured and marketed.

It is a further object of the present invention to provide a new and improved vehicular air purification system which is of a durable and reliable construction.

An even further object of the present invention is to provide a new and improved vehicular air purification system which is susceptible of a low cost of manufacture with regard to both materials and labor, and which accordingly is then susceptible of low prices of sale to the consuming public, thereby making such vehicular air purification system economically available to the buying public.

Still yet another object of the present invention is to provide a new and improved vehicular air purification system which provides in the apparatuses and methods of the prior art some of the advantages thereof, while simultaneously overcoming some of the disadvantages normally associated therewith.

Still another object of the present invention is to purify air within a vehicle.

Lastly, it is an object of the present invention to provide a new and improved vehicular air purification system for use with a vehicle having a ventilation system with a plurality of output vents each including a plurality of horizontally positioned directing vanes. Included is an active filter unit housing with a rectilinear configuration having a closed top face, a closed bottom face, a front face, a rear face, and a pair of closed side faces defining an interior space. The rear face and the front face both have a plurality of horizontal ventilation slots formed therein. One of the faces of the active filter unit housing has a clip adapted to allow the active filter unit housing to be removably attached within the vehicle. A motor support situated within the active filter unit housing is included for bracing a motor situated therein. The motor has a stator fixedly coupled to the motor support with an axis defined by the motor positioned perpendicularly with respect to the front face and the rear face of the active filter unit housing. The motor further has a rotor coaxially coupled within the stator with a fan coupled thereto for rotating upon the receipt of power by the motor. Further included is a vehicle cigarette lighter power adapter and a connection wire coupled between contacts of the power adapter and the motor. A first filter is coupled to the active filter unit housing for filtering air passing between the front and rear faces thereof. Working in conjunction with the active filter unit is at least one passive filter unit housing coupled adjacent at least one of the output vents of the vehicle. Such filter unit housings each have a second filter removably situated therein for filtering air passing therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
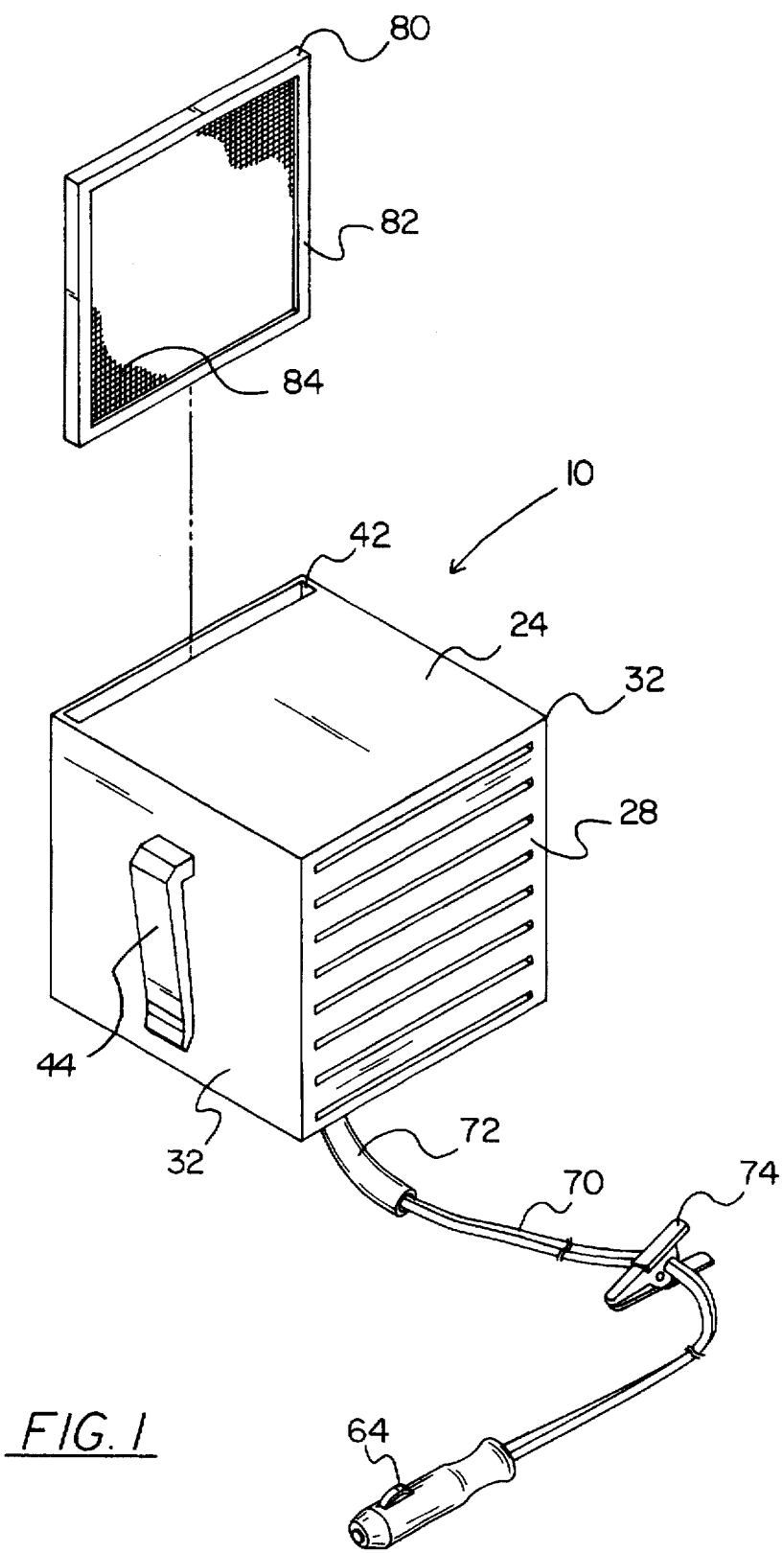
FIG. 1 is a perspective illustration of the preferred embodiment of the vehicular air purification system constructed in accordance with the principles of the present invention.

With reference now to the drawings, and in particular to FIG. 1 thereof, a new and improved vehicular air purification system embodying the principles and concepts of the present invention and generally designated by the reference numeral 10 will be described.

The present invention, the new and improved vehicular air purification system, is comprised of a plurality of components. Such components in their broadest context include active and passive filter units. Such components are individually configured and correlated with respect to each other so as to attain the desired objective.

Figure 6:
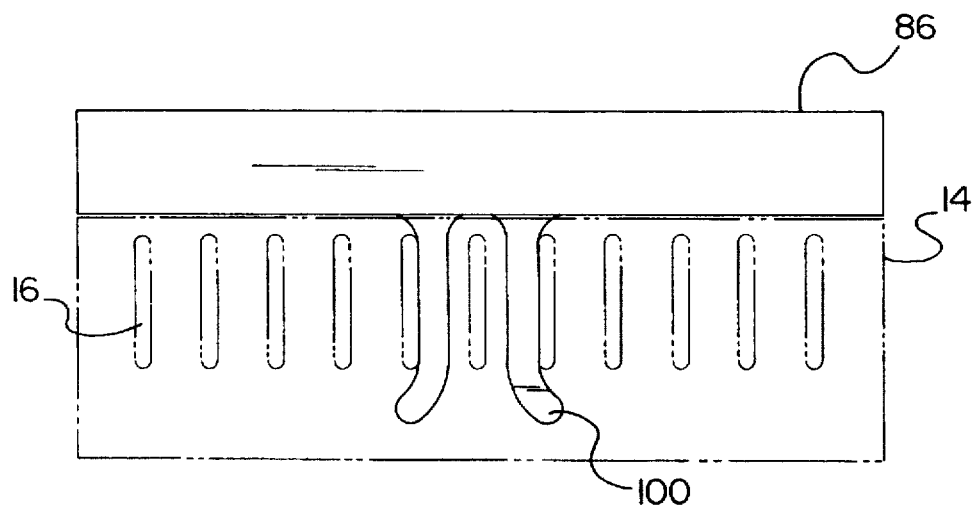
FIG. 6 is a side view of one of the passive filter unit housings; in an operative orientation.

More specifically, it will be noted that the system 10 of the present invention is for use with a vehicle 12 having a ventilation system with a plurality of output vents 14. As shown in FIG. 6, each of such output vents has a plurality of horizontally positioned air directing vanes 16. Further, vehicle further includes a pair of sun visors 18 and a vehicle cigarette lighter 20.

The present invention includes an active filter unit housing 22 with a rectilinear configuration having a closed top face 24, a closed bottom face 26, a front face 28, a rear face 30, and a pair of closed side faces 32 defining an interior space. Note FIGS. 1 & 2. The rear face of the housing has a plurality of horizontal ventilation slots 34 formed therein. The front face of the active filter unit housing also has a plurality of horizontal ventilation slots formed therein. Such slots are situated about the entire front and rear surface for affording optimum air transfer therethrough. A rear retention face 36 is included having a size equal to that of the rear face. Such rear retention face is coupled to the rear face via a bottom strip 38 and a pair of side strips 40 defining a top rectangular slot. See FIG. 2. The top slot is adapted for allowing access to an intermediate space 42 situated between the rear face and the rear retention face. It should be noted that the intermediate space defines less than 10% the volume defined by the interior space of the active filter unit housing. One of the side faces of the active filter unit housing includes an elongated resilient clip 44 having a first end thereof integrally coupled thereto. As shown in FIG. 1, the length of the clip extends between the top face and the bottom face of the active filter unit housing. By this structure, the clip may be employed to removably attach the active filter unit housing to the visor of the vehicle.

Figure 2:
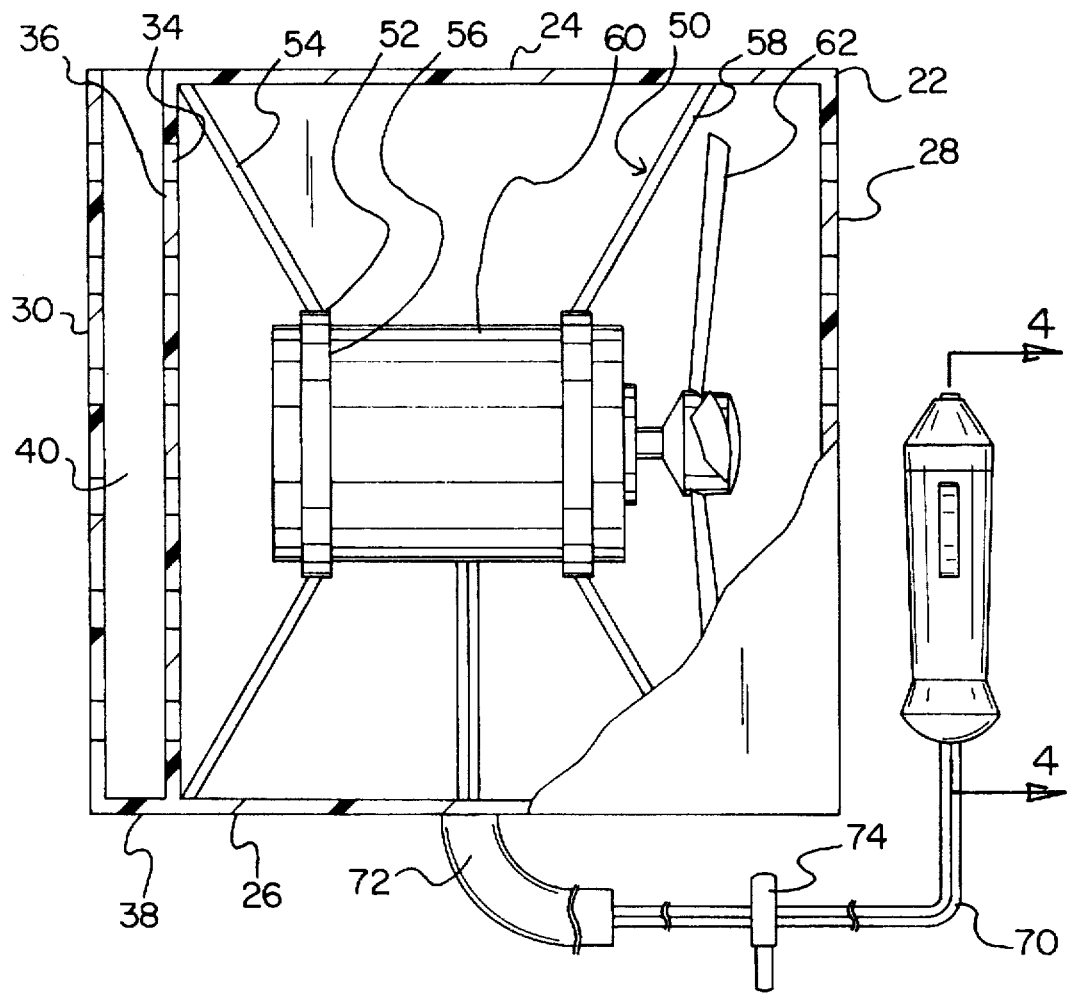
FIG. 2 is a cross-sectional view of the active filter unit housing of the present invention.

With reference now to FIG. 2, a motor support 50 is included. Such support includes a rear brace 52 having a pair of rods 54 attached at first ends thereof to the top face and the bottom face of the active filter unit housing, respectively. The rods of the rear brace are coupled adjacent the rear face of the active filter unit housing and are angled inwardly toward a center of the interior space thereof. The rear brace further has an annular member 56 coupled to second ends of the rods thereof. Associated with the rear braces is a front brace 58 having a pair of rods attached at first ends thereof to the top face and the bottom face of the active filter unit housing, respectively, adjacent, the front face thereof. Such rods are angled inwardly toward a center of the interior space of the housing. Similar to the rear brace, the front brace also has an annular member coupled to second ends of the rods thereof.

Next provided is a motor 60 having a stator fixedly coupled within the annular members of the motor support, as shown in FIG. 2. When fixed in place, an axis defined by the motor is positioned perpendicularly with respect to the front face and the rear face of the active filter unit housing. Another component of the motor is a rotor coaxially coupled within the stator with a four-vaned fan 62 coupled thereto for rotating upon the receipt of power by the motor.

Figure 3:
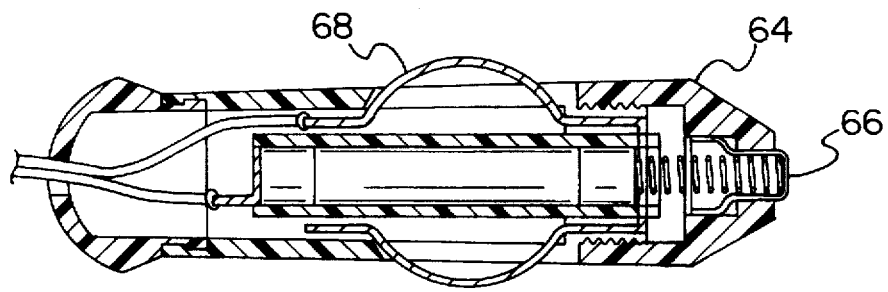
FIG. 3 is a cross-sectional view of the power adapter shown in FIGS. 1 & 2.

As shown in FIG. 3, a vehicle cigarette lighter power adapter 64 is included with a cylindrical configuration. The power adapter is included for inserting within the vehicle cigarette lighter and receiving power therefrom. The power adapter has a spring-biased contact 66 situated on an end thereof for abutting a first terminal of the vehicle cigarette lighter. A pair of generally U-shaped resilient contacts 68 are coupled to a periphery of the power adapter. Such contacts are adapted for abutting a second terminal of the vehicle cigarette lighter.

For transferring power to the motor and fan, a connection wire 70 is coupled between the contacts of the power adapter and the motor. The connection wire are situated through an aperture formed in the bottom face of the active filter unit housing with an associated elongated grommet 72 encompassing a portion thereof. The grommet extends along at least 15% the total length of the wire. The connection wire further includes an alligator clip 74 with a pair of opposing members pivotally coupled at central extents thereof. One of the opposing members is coupled to the connection wire at a central extent thereof. The alligator clip includes an unillustrated spring to afford a first biased open orientation and an unbiased closed orientation. It should be understood that the alligator clip is critical for clamping to a portion of an interior of the vehicle thereby maintaining the connection wire out of a view of the driver.

Associated with the active filter unit housing is a first filter 80 having a rectangular frame 82. A multiplicity of fibers 84 are coupled within the frame. The fibers have fine carbon filaments attached thereto for preventing the passage of particles in air passing therethrough. In use, the first filter is removably situated in the top slot of the active filter unit housing for filtering air passing between the front and rear faces thereof. As an option, the first filter may be scented. It should be noted that the filters may be replaced as needed.

Figure 4:
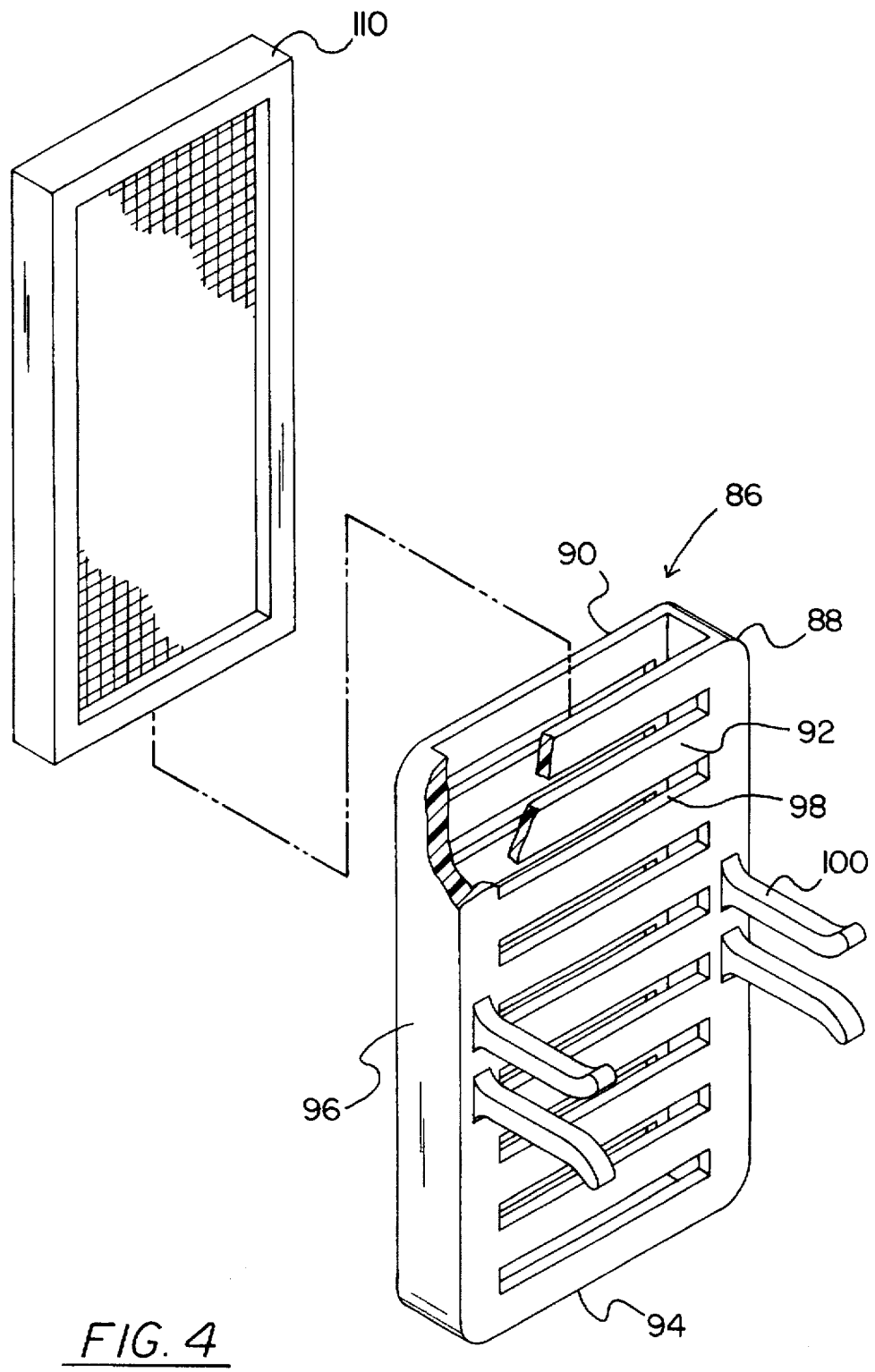
FIG. 4 is a perspective view of one of the passive filter units of the system of the present invention.
Figure 5:
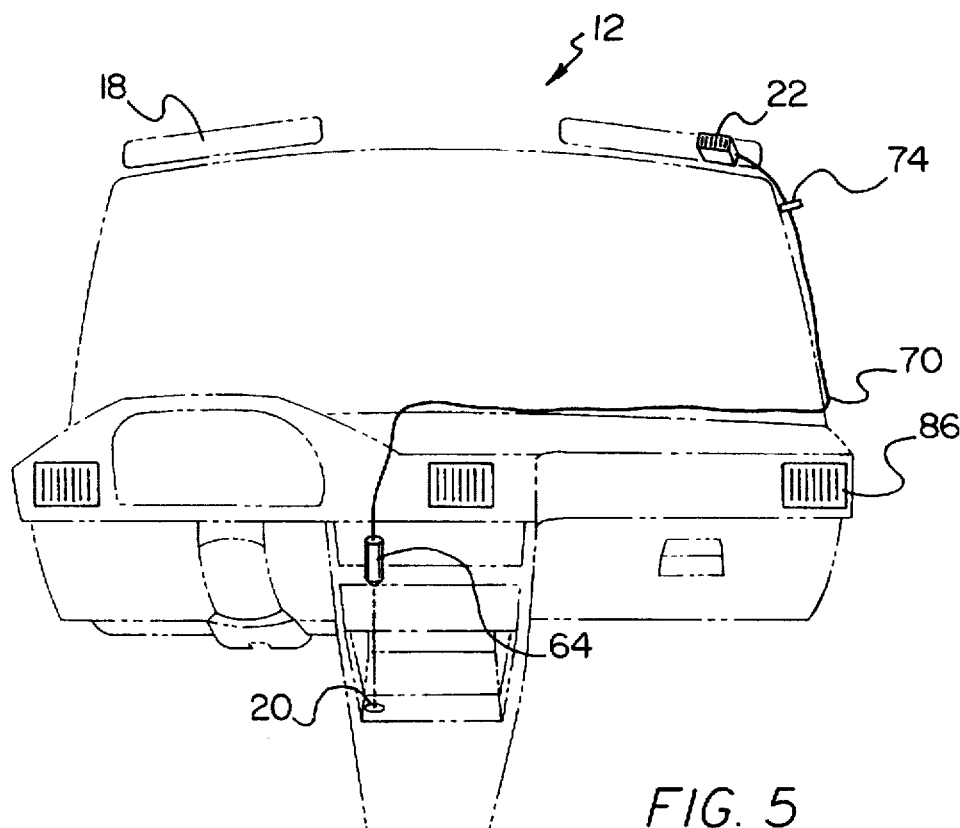
FIG. 5 is a perspective view of the system of the present invention in use.

Working conjunction with the active filter unit to purify air within a vehicle is a plurality of passive filter units 86 each with an associated housings 88. Note FIG. 4. Each housing has a rectangular configuration with a front face 90, a rear face 92, a bottom face 94, and a pair of side faces 96 defining an interior space with a top opening. The top face and the rear face both have a plurality of horizontal ventilation slots 98 formed therein. As shown in FIG. 4, the rear face has a coupling means 100 for connecting to the output vents of the vehicle. An example of such coupling means is two paired resilient posts coupled on opposite sides of the rear face. Such posts may be biased inwardly to fit between the horizontal vanes of the output vents as shown in FIG. 6.

Finally, a plurality of second filters 110 are included each having a rectangular frame with a multiplicity of fibers having fine carbon filaments attached thereto. Similar to the filters of the active filter unit, the present filters are adapted for preventing the passage of particles in air passing therethrough. During use, the second filters each are removably situated in the interior space of an associated passive filter unit housing for filtering air passing between the front and rear faces thereof. In an alternate embodiment, the second filters are scented.

The active and passive filter units thus work in conjunction to filter air circulated by a conventional vehicular air circulation system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicular air purification system comprising, in combination:

a vehicle having a ventilation system with a plurality of output vents each having a plurality of horizontally positioned directing vanes, vehicle further including a pair of sun visors and a vehicle cigarette lighter;

an active filter unit housing with a rectilinear configuration having a closed top face, a closed bottom face, a front face, a rear face, and a pair of closed side faces defining an interior space, an entire surface of the rear face having a plurality of horizontal ventilation slots formed therein and a rear retention face having a size equal to that of the rear face, the rear retention face being coupled to the rear face via a bottom strip and a pair of side strips defining a top rectangular slot for allowing access to an intermediate space situated between the rear face and the rear retention face, the intermediate space defining less than 10% the volume defined by the interior space of the active filter unit housing, the front face of the active filter unit housing also having a plurality of horizontal ventilation slots formed therein, one of the side faces of the active filter unit housing having an elongated resilient clip having a first end thereof integrally coupled thereto with the length of the clip extending between the top face and the bottom face of the active filter unit housing, the clip being removably attached to the visor of the vehicle;

a motor support including a rear brace having a pair of rods attached at first ends thereof to the top face and the bottom face of the active filter unit housing, respectively, adjacent the rear face thereof and angled inwardly toward a center of the interior space thereof, the rear brace further having an annular member coupled to second ends of the rods thereof, the motor support also including a front brace having a pair of rods attached at first ends thereof to the top face and the bottom face of the active filter unit housing, respectively, adjacent the front face thereof and angled inwardly toward a center of the interior space thereof, the front brace further having an annular member coupled to second ends of the rods thereof;

a motor having a stator fixedly coupled within the annular members of the motor support with an axis defined by the motor positioned perpendicularly with respect to the front face and the rear face of the active filter unit housing, the motor further having a rotor coaxially coupled within the stator with a four-vaned fan coupled thereto for rotating upon the receipt of power by the motor;

a vehicle cigarette lighter power adapter with a cylindrical configuration for inserting within the vehicle cigarette lighter, the power adapter having a spring-biased contact situated on an end thereof for abutting a first terminal of the vehicle cigarette lighter and a pair of generally U-shaped resilient contacts coupled to a periphery of the power adapter for abutting a second terminal of the vehicle cigarette lighter;

a connection wire coupled between the contacts of the power adapter and the motor, the connection wire situated through an aperture formed in the bottom face of the active filter unit housing with an associated elongated grommet encompassing a portion thereof and extending at least 15% a total length of the wire, the connection wire further including an alligator clip with a pair of opposing members pivotally coupled at central extents thereof, one of the opposing members coupled to the connection wire at a central extent thereof, the alligator clip having a spring to afford a first biased open orientation and an unbiased closed orientation for clamping to a portion of an interior of the vehicle;

a first filter having a rectangular frame with a multiplicity of fibers coupled therein, the fibers having fine carbon filaments attached thereto for preventing the passage of particles in air passing therethrough, the first filter removably situated, in the top slot of the active filter unit housing for filtering air passing between the front and rear faces thereof, wherein the filter is scented;

a plurality of passive filter unit housings each with a rectangular configuration having a front face, a rear face, a bottom face, and a pair of side faces defining an interior space with a top opening, the front face and the rear face having a plurality of horizontal ventilation slots formed therein, the rear face having coupling means for connecting to the output vents of the vehicle, wherein the coupling means includes two paired resilient posts coupled on opposite sides of the rear face with the posts being biased inwardly to fit between the vanes of the output vents; and a plurality of a second filters each having a rectangular frame with a multiplicity of fibers having fine carbon filaments attached thereto for preventing the passage of particles in air passing therethrough, the second filters each removably situated in the interior space of an associated passive filter unit housing for filtering air passing between the front and rear faces thereof, wherein the filter is scented.

* * * * *